United States Patent [19]

Kim

[11] Patent Number: 4,586,285
[45] Date of Patent: May 6, 1986

[54] TOP GUIDE FOR OPEN-FACE REEL

[76] Inventor: Jeong R. Kim, P.O. Box 408 Gwang Hwa Moon, Seoul, Rep. of Korea

[21] Appl. No.: 679,749

[22] Filed: Dec. 10, 1984

[30] Foreign Application Priority Data

Dec. 29, 1983 [KR] Rep. of Korea .......... 11311/1983[U]

[51] Int. Cl.⁴ ............................................. A01K 87/04
[52] U.S. Cl. ....................................................... 43/24
[58] Field of Search .......................... 43/24, 18.1, 18.5

[56] References Cited

U.S. PATENT DOCUMENTS

| | | | |
|---|---|---|---|
| 2,709,315 | 5/1955 | Walter | 43/24 |
| 2,740,221 | 4/1956 | Kono | 43/24 |
| 3,325,938 | 6/1967 | Minera | 43/24 |

Primary Examiner—Gene P. Crosby
Attorney, Agent, or Firm—Brooks & Kushman

[57] ABSTRACT

A top guide for a fishing rod having a supporting ring fixed to the tip of the rod body by a brace, and has a holding groove with width being 1.5 times that of the fishing line diameter to hold the fishing line, extended from supporting ring 4. The fishing line can be thrown in a desired direction without requiring finger pressure on the fishing line, against the rod.

1 Claim, 5 Drawing Figures

TOP GUIDE FOR OPEN-FACE REEL

BACKGROUND

This invention relates to a top guide fixed at the tip of a fishing rod for open-face reel; and particularly to the improvement of a top guide for facilitating the convenient casting of a fishing line farther away than conventional rods.

The conventional top guide structure, which has been adapted for open-face spinning reel, supports a fishing line and is constructed so that a circurlar support is fixed at a slanting angle away from the tip of the rod by means of bracing stripes between the rod and the ring. When using this conventional rod for casting, the user must flip the reel bail arm, releasing the fishing line, while at the same time keeping the line taunt with the index finger. Some people prefer to hold the fishing line against the rod with their finger before casting. Thereafter, the rod is placed backward behind the person in readiness to cast. As the rod is whipped forward the user must coordinate the release of the finger pressure against the fishing line depending on the desired distance and direction which he wishes to place his hook or lure etc.

Successful casting with the open face reel and rod takes considerable skill and practice, for if done improperly the result can be a tangled fishing line or an improper throw of the lure high into the air or immediately at the feet of the user. Even an experienced user often makes mistakes when casting with the open-face reel and rod.

SUMMARY OF THE INVENTION

Accordingly, this invention is devised to resolve the inconventence and difficulty when a fishing line is thrown using the open-face reel. This invention is constructed so that the fishing line can be thrown in a desired direction without requiring finger pressure on the fishing line against the rod. Thus the object of the present invention is to provide an open-face reel containing a top guide according to the principle of the invention.

An embodiment of this invention will now be described, by way of example, with reference to the accompanying drawings in which;

FIG. 1 is a perspective view of the invention.
FIG. 2 is a plane view of the invention.
FIG. 3 is a side view of the invention.
FIG. 4 is a cross sectional view of the invention.
FIG. 5 is a view illustrating the actual use of a fishing rod and reel employing the invention.

DETAILED DESCRIPTION

Figure 1:
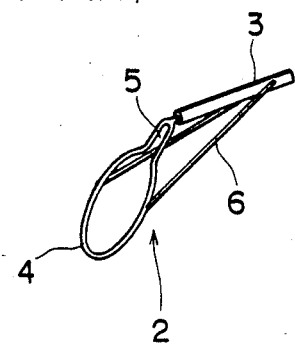
Figure 2:
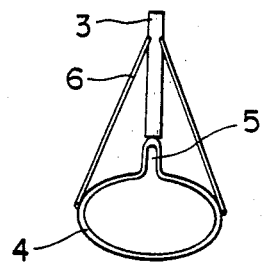
Figure 3:
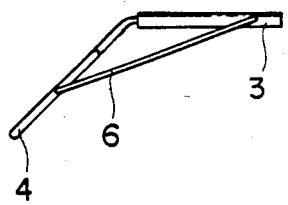
Figure 4:
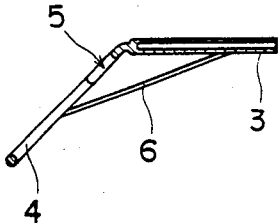

Referring now to the drawings, typically the top guide 2, comprising supporting ring 4 fixed to the tip of the rod body by brace 6, has holding groove 5 with width being 1.5 times that of the fishing line diameter to hold the fishing line, extended from supporting ring 4, and has body 3 which fits snugly over a fishing rod tip.

Figure 5:
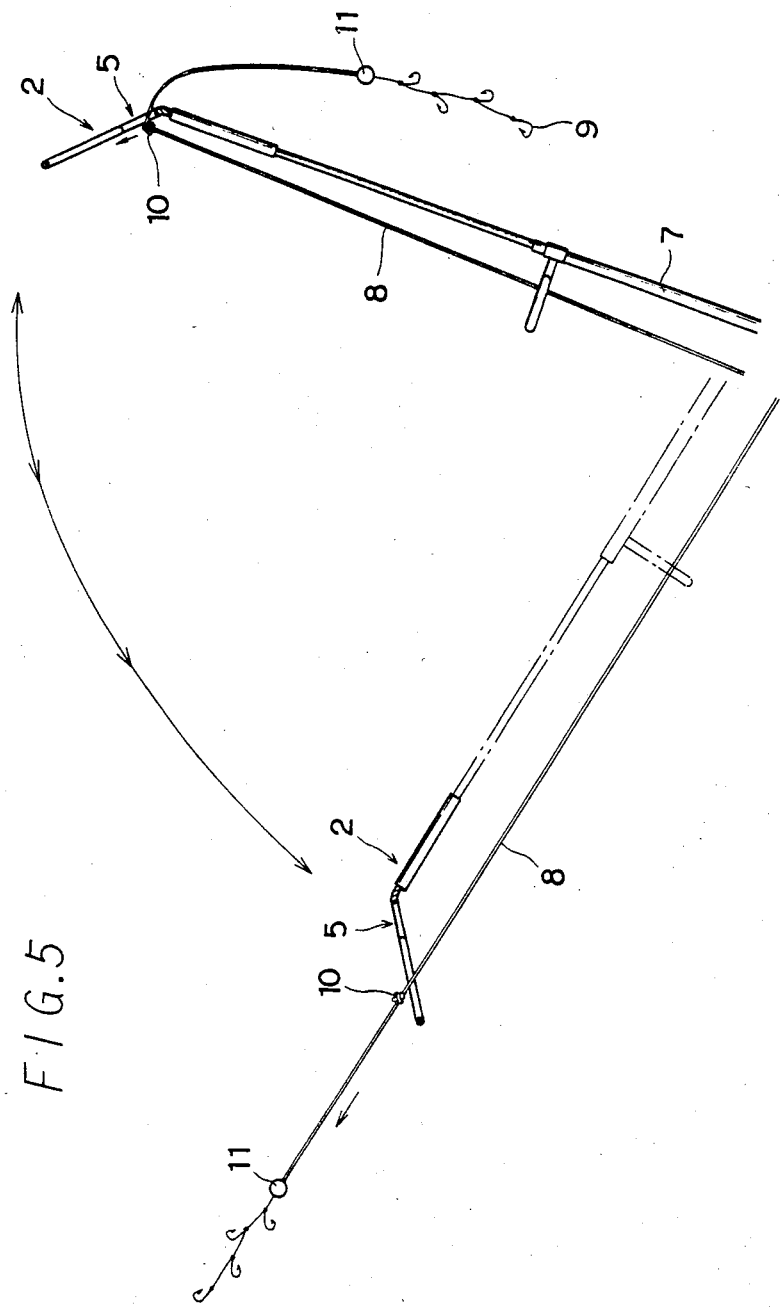

Therefore, to use the fishing rod according to this invention, when the fishing line is placed in backward position as shown in FIG. 5, knot 10 between fishing hook 9 in fishing line 8 falls into holding groove 5 of supporting ring 4 back weight of hook 9 and sinker 11, thereby making finger pressure against fishing line 8 unnecessary.

Accordingly, as the rod is cast forward, the inertia of hook 9 and sinker 11 moves fishing line 8 out of holding groove 5 thereby properly releasing the line for accurate and consistent throw of the fishing line.

As it is apparent from the above description, this invention is characterised in that with it anyone can easily, conveniently and accurately cast a fishing line.

I claim:

1. A fishing rod top line guide for use on an end of an elongated fishing rod, the line guide comprising:

a tubular body having a closed end and also having an open end for receiving the end of the fishing rod;

a ring having a generally circular shape and also having a U shape defining a line holding groove extending radially from the circular shape thereof, said U shape of the ring having a closed end connected to the closed end of the tubular body, said groove defined by the U shape of the ring having a width of about 1.5 times the diameter of a fishing line used with the fishing rod in order to automatically hold the fishing line with a knot therealong until a cast is made; and a brace having two segments extending between the circular shape of the ring and the open end of the tubular body on opposite sides of the groove to support the ring on the tubular body in an inclination with respect to the elongated direction of the fishing rod.

* * * * *